United States Patent [19]
Edenhofer

[11] 3,846,431
[45] Nov. 5, 1974

[54] HETEROCYCLICALLY DIBENZO(A,D)CYCLOHEPTA(1,4)DIEN-5-ONE DERIVATIVES

[75] Inventor: Albrecht Edenhofer, Riehen

[73] Assignees: Hans Spiegelberg, Basel, both of, Switzerland; Hoffman-La Roche, Inc., Nutley, N.J.

[22] Filed: Aug. 25, 1972

[21] Appl. No.: 283,877

Related U.S. Application Data

[62] Division of Ser. No. 114,718, Feb. 11, 1971, Pat. No. 3,705,168, which is a division of Ser. No. 838,317, July 1, 1969, Pat. No. 3,586,718, which is a division of Ser. No. 517,893, Jan. 3, 1966, Pat. No. 3,478,048.

[30] Foreign Application Priority Data

Jan. 8, 1965 Switzerland............................ 232/65
Jan. 14, 1965 Switzerland............................ 525/65

[52] U.S. Cl.......................................... 260/268 TR
[51] Int. Cl.............................................. C07d 51/70
[58] Field of Search............................... 260/268 TR

[56] References Cited
UNITED STATES PATENTS

| | | | |
|---|---|---|---|
| 3,370,061 | 2/1968 | Corts............................ | 260/268 TR |
| 3,457,264 | 7/1969 | Viterbo et al. ............... | 260/268 TR |
| 3,557,116 | 1/1971 | Fouche......................... | 260/268 TR |
| 3,631,103 | 12/1971 | Reybellet..................... | 260/268 TR |

*Primary Examiner*—Donald G. Daus
*Attorney, Agent, or Firm*—Samuel L. Welt; Bernard S. Leon; William G. Isgro

[57] ABSTRACT

2,3,3a,12b-Tetrahydro-8H-dibenzo[3,4;6,7]cyclohept[1,2-d]oxaoles and dibenzo[a,d]cyclohept[1,4-]dienes bearing, for example, substituents at the 10- and 11-positions, are prepared, inter alia, from the corresponding dibenzocycloheptatrienones. The products are useful as antidepressants.

2 Claims, No Drawings

HETEROCYCLICALLY DIBENZO(A,D)CYCLOHEPTA(1,4)DIEN-5-ONE DERIVATIVES

CROSS-REFERENCE TO RELATED APPLICATIONS

This application is a division of U.S. Pat. Ser. No. 114,718, filed Feb. 11, 1971, now U.S. Pat. No. 3,705,168, issued Dec. 5, 1972 which in turn is a division of U.S. Pat. Ser. No. 838,317, filed July 1, 1969, now U.S. Pat. No. 3,586,718, issued June 22, 1971 which in turn is a division of U.S. Pat. Ser. No. 517,893, filed Jan. 3, 1966, now U.S. Pat. No. 3,478,048, patented Nov. 11, 1969.

BRIEF SUMMARY OF THE INVENTION

The invention relates to compounds of the formula

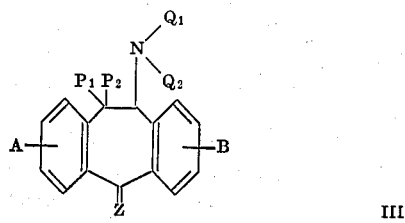

III wherein A and B each is, individually, hydrogen, halogen, lower alkyl, lower alkoxy, trifluoromethyl, lower alkylmercapto, lower alkanoyl, sulfamoyl, lower alkylsulfamoyl or lower alkylsulfonyl; Z is oxo, oxo ketalized with lower alkanol or lower alkylenedioxy; $P_1$ is hydrogen, hydroxyl, lower alkanoyloxy or halogen; $P_2$ is hydrogen, or together with $P_1$, is oxo; $Q_1$ and $Q_2$, taken together with the nitrogen atom, is a heterocyclic ring of 5 to 6 members selected from the group consisting of unsubstituted and lower alkyl of up to 7 carbon atoms substituted piperazino, morpholino, imidazolino, 1-(2H)-pyrimidino, 1-(2H)-isothiazolino, pyrazolino and pyrazolidino; and pharmaceutically acceptable acid addition salts thereof. The end products are useful as antidepressants.

DETAILED DESCRIPTION OF THE INVENTION

The present invention relates to novel therapeutically active compounds. More particularly, the present invention relates to novel derivatives of dibenzocycloheptene. The compounds of this invention are dibenzocycloheptene derivatives of the formula

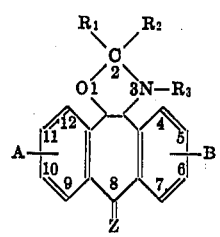

I wherein A and B each is, individually, hydrogen, halogen, lower alkyl, lower alkoxy, trifluoromethyl, lower alkylmercapto, lower alkanoyl, sulfamoyl, lower alkylsulfamoyl or lower alkylsulfonyl; Z is oxo, oxo ketalized with lower alkanol or lower alkylenedioxy; $R_1$ is hydrogen, lower alkyl or aryl; $R_2$ is hydrogen, lower alkyl or aryl; $R_1$ taken together with $R_2$ is thio, oxo or imino; $R_3$ is hydrogen or lower alkyl and pharmaceutically acceptable acid addition salts thereof.

The substituents on each of the benzene rings of the compound of Formula I can be one or more halogen atoms, e.g., fluorine, chlorine, bromine and iodine, chlorine and bromine being especially preferred; straight or branched chain lower alkyl groups with up to 7 carbon atoms, e.g., methyl, ethyl, butyl, hexyl; lower alkoxy groups with up to 7 carbon atoms, e.g., methoxy, ethoxy, heptoxy; lower alkylmercapto groups with up to 7 carbon atoms, e.g., methylmercapto, ethylmercapto; lower alkanoyl groups with up to 7 carbon atoms, e.g., acetyl, caproyl; lower alkylsulfonyl, e.g., methylsulfonyl, hexylsulfonyl; sulfamoyl or lower alkylsulfamoyl, e.g., methylsulfamoyl.

The term "lower alkyl" as employed in this application includes lower alkyl groups of up to 7 carbon atoms, e.g., methyl, ethyl, isopropyl, etc. The term "aryl" includes phenyl, benzyl, and also includes alkaryl groups, e.g., tolyl, xylyl and isopropylphenyl, etc. The term "cycloalkyl" includes cyclic hydrocarbons of up to 7 carbon atoms which can be substituted lower alkyl groups, i.e., lower alkyl-cycloalkane, e.g., methylcyclopropyl, or cycloalkyl-lower alkylene, e.g., cyclopropylmethylene. The term "halogen" or "halo" as used herein includes fluorine, chlorine, bromine and iodine or their radicals, with chlorine and bromine being especially preferred. The term "halo-dilower alkylamino" is intended to mean di-(halo-lower alkyl)amino and the term "hydroxy-dilower alkylamino" is intended to mean di-(hydroxy-lower alkyl)amino.

As indicated, Z can be oxo or ketalized oxo wherein the ketalization is effected with either a lower alkylene glycol in which case Z is a lower alkylenedioxy moiety or with a lower alkanol in which case Z represents, together with the carbon atom at position-8, a moiety of the formula:

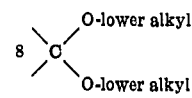

As indicated, there can be used as ketal-forming substances lower alkanols and lower alkylene glycols, for example, methanol, ethanol, or ethylene glycol.

The oxazolidine compounds of Formula I can be prepared by reacting compounds of the formula:

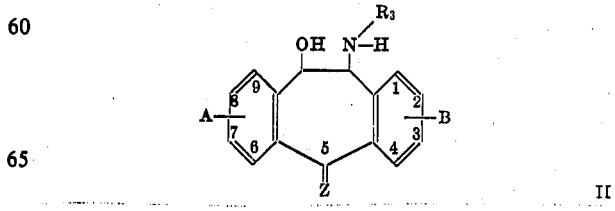

II wherein A, B, R$_3$ and Z have the same meaning as above
with a cyclizing agent in a conventional manner.

The cyclizing agents which can be employed are known and include, for example, cyanogen halide, aldehydes or ketones, carbonates and carbonic acid halides. The product on cyclization of compounds of Formula II is the corresponding oxazolidine. For example, cyclization of compounds of Formula II, wherein Z is oxo, with a cyanogen halide, e.g., cyanogen bromide, results in the preparation of 2-imino-dibenzocyclohept-oxazolidinones. The above reaction is preferably conducted in the presence of an inert solvent at room temperature. Cyclization may be effected with other reactants known for that purpose, e.g., an aldehyde or ketone, for example, a lower alkanoic acid aldehyde, e.g., acetaldehyde, or a di-lower alkyl ketone, e.g., acetone, or a cyclo-lower alkyl ketone, e.g., cyclohexanone. When employing an aldehyde or ketone it is preferable to conduct the reaction at reflux temperature under dehydration conditions. When acetone is the cyclization agent and Z is oxo, 2-dimethyl-dibenzo-cyclohept-oxazolidinone is obtained. If Z is a ketalized oxo in the starting material, the product is the corresponding ketal. Other known cyclization agents include the carbonates, e.g., diethylcarbonate and the carbonic acid halides, e.g., phosgene. When employing a carbonate, it is preferable to heat the reaction mixture to reflux temperature in the presence of a trace of metallic sodium. When employing carbonic acid halides, it is preferable to conduct the reaction at room temperature, in the presence of an acid-binding agent, e.g., lead carbonate. With either diethylcarbonate or phosgene as the cyclization agent, the corresponding 2-oxo-dibenzocyclohept-oxazolidinones or ketals thereof are obtained.

In an embodiment related to that discussed above, the invention also provides novel compounds of the formula

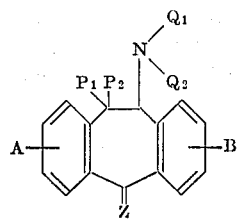

III wherein A, B and Z have the same meaning as above; P$_1$ is hydrogen, hydroxyl, lower alkanoyloxy or halogen; P$_2$ is hydrogen, or together with P$_1$, is oxo; Q$_1$ and Q$_2$ each is, individually, hydrogen, lower alkyl, cyclo-lower alkyl, aryl, lower aralkyl, lower alkanoyl, cyclo-lower alkanoyl, aroyl, halogen, halo-lower alkyl, halo-lower alkanoyl, halo-aryl, halo-lower aralkyl, halo-aroyl, hydroxy-lower alkyl, hydroxy-lower alkanoyl, hydroxy-aralkyl, hydroxy-aroyl, amino, lower alkylamino, di-lower alkylamino, halo-lower alkylamino, halo-di-lower alkylamino, hydroxy-lower alkylamino, hydroxy-di-lower alkylamino; Q$_1$ and Q$_2$, taken together with the nitrogen atom, is a heterocyclic ring of 5 to 6 members or a heterocyclic ring of 5 to 6 members having a lower alkyl substituent;
and pharamaceutically acceptable acid addition salts thereof.

As employed herein the term "lower alkanoyl" includes the acyl moiety of lower alkyl carboxylic acids with up to 7 carbon atoms, i.e., acids devoid of the carboxy proton, e.g., formyl, acetyl, propionyl, butanoyl, etc.; "cyclo-lower alkanoyl" includes cyclo-lower alkyl carboxylic acids, e.g., cyclopropionyl; "aroyl" includes, for example, benzoyl, phenacetyl and phthaloyl; and "lower aralkyl" includes, for example, benzyl and phenethyl. The substituent groups named heretofore can each, individually, also be substituted with, for example, hydroxyl groups, e.g., 3-hydroxy propylene, hydroxy-benzoyl; or with halogen atoms, e.g., chloropropyl or bromobenzyl; or with any combination of the aforegoing. Furthermore, the aryl moieties named above can bear two or more substituents, whether identical or not, or any of the relative positions of the phenyl group, e.g., ortho, meta and para. When either Q$_1$ or Q$_2$ is amino or substituted amino linked directly to the nitrogen atom, it forms a hydrazine residue, e.g., methylhydrazino, ethylhydrazino, isopropylhydrazino, etc. As indicated above, Q$_1$ and Q$_2$, together with the nitrogen atom, can represent a heterocyclic ring of 5 to 6 members or a heterocyclic ring of 5 to 6 members having a lower alkyl substituent. That heterocyclic ring can contain other hetero atoms besides nitrogen, e.g., oxygen or sulfur. Examples of such heterocyclic rings are piperidino, piperazino, pyrrolidino, morpholino, imidazolino, 1(2H)pyrimidino, 1(2H)isothiazolino, pyrazolino, pyrazolidino, methyl-piperidino, hexyl-piperidino, pentyl-morpholino, etc.

The compounds of Formula III are generic to those of Formula II and can be prepared from the corresponding dibenzocycloheptatrienones. For example, compounds of the formula:

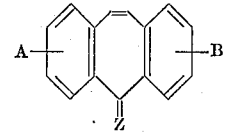

IV wherein A, B and Z have the same meaning as above, can be reacted with an agent which yields hypolhalous acid in the presence of water, i.e., a halogenating agent, e.g., N-bromoacetamide or N-bromosuccinimide in water to form a compound of the formula:

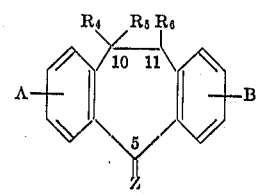

V wherein A, B and Z have the same meaning as above; R$_4$ is hydroxyl; R$_5$ is hydrogen; and R$_6$ is halogen.

Compounds of Formula V can be aminated in a conventional manner, for example, by reaction with equimolar proportions of a lower alkylamine at about 40°–80°C. The presence of a solvent in the reaction mixture is not necessary but can be used if desired. When employing amines volatile at the reaction temperature, it is expedient to work in a closed system. The product resulting is a compound of the formula:

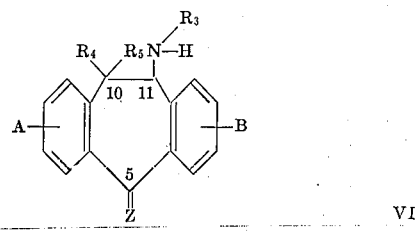

VI wherein A, B, Z, $R_3$, $R_4$ and $R_5$ have the same meaning as above.

Compounds of Formula VI are identical with compounds of Formula II when $R_4$ is hydroxyl.

The compounds of Formula VI can also be obtained in a more direct manner. For example, with reference to compounds of Formula V wherein $R_4$ and $R_6$ together form an oxygen bridge, i.e., an epoxy linkage, the epoxy compounds can be directly aminated in a conventional manner to the corresponding 10-hydroxy-11-lower alkylamino compounds of Formula VI. Direct amination can be effected by, for example, reacting the 10,11-epoxy-dibenzo [1,2;4,5]cycloheptanones or their ketals with lower alkylamine, preferably at a temperature between about 100° and 150°C. and advantageously in the presence of a solvent, e.g., ethanol or dioxane. With amines volatile at the reaction temperature, it is convenient to work in a closed system under pressure. If ammonia is used in lieu of the lower alkylamine, then the corresponding 10-hydroxy-11-amino compound will be obtained. The epoxide starting materials, i.e., where $R_4$ and $R_6$ in Formula V are taken together to form an oxygen bridge, can be prepared from the corresponding dibenzocycloheptatrienones depicted by Formula IV, as described in Bull. Soc. Chim. France (1960), p. 404, or as described hereinafter in Example 6. In another variation, the epoxide starting materials can be used to prepare the 10-hydroxy-11-halo compounds depicted by Formula V by reacting the epoxides with a magnesium halide, e.g., magnesium bromide.

The 10-hydroxy-11-halo compounds of Formula V prepared by either of the aforesaid methods, i.e., halogenation of compounds of Formula IV or treatment of the corresponding epoxides with a magnesium halide, can be converted into the corresponding 10-oxo- 11-halo compounds. The 10-oxo-11-halo compounds are depicted by Formula V when $R_4$ and $R_5$ taken together represent an oxo group. The 10-oxo-11-halo compounds can be prepared by reacting the corresponding 10-hydroxy-11-halo compounds with a dichromate/sulfuric acid reagent, e.g., sodium dichromate/sulfuric acid.

Compounds of Formula V wherein $R_4$ and $R_5$ taken together represent an oxo group can be aminated in the same manner as indicated above. Compounds of Formula V wherein $R_4$ and $R_6$ taken together form an oxygen bridge can be aminated preferably at a higher temperature than amination of corresponding non-epoxy compounds, i.e., between 100° and 150°C., and the presence of a solvent such as an alcohol, i.e., lower alkanol, e.g., ethanol, or an ether, e.g., dioxane, in the reaction mixture is desirable. The reaction can also be conducted with water as the reaction medium. When employing amines volatile at the reaction temperature, it is expedient to work in a closed system under pressure.

Hence, amination of compounds of the formula

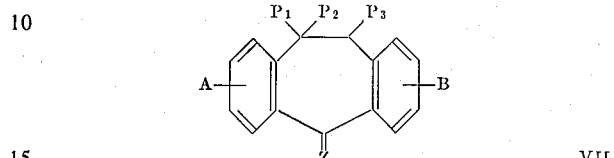

VII wherein A, B and Z have the same meaning as above; $P_1$ is hydrogen, hydroxyl, lower alkanoyloxy or halogen; $P_2$ is hydrogen or together with $P_1$ is oxo; and $P_3$ is halogen or together with $P_1$ is oxygen with an amine or a substituted amine, e.g., lower alkylamine or lower alkanoylamine produces compounds of Formula III. If desired, subsequent to amination, the amino moiety at position-11 can be further substituted, e.g., acylated to form an amide.

Compounds of Formula III can be further reacted to produce a variety of derivatives. For example, when $P_1$ in Formula III is hydroxyl, reaction with thionyl chloride will result in the replacement of the hydroxyl group with chlorine. The resulting 10-chloro-11-amino derivative of Formula III thus obtained can, when either $Q_1$ or $Q_2$ is hydrogen or when both $Q_1$ and $Q_2$ are hydrogen, be acylated to form the corresponding 10-chloro-11-lower alkanoylamino compound of Formula III. In addition, if desired, the chlorine atom in the above 10-chloro-11-amino derivative of Formula III can be removed prior to acylation and thereby an 11-amino or an 11-lower alkanoylamino derivative of Formula III can be obtained. In like manner, when $P_1$ is hydroxy and either $Q_1$ or $Q_2$ is hydrogen, or both are hydrogen, acylation can be conducted in a conventional manner, preferably under mild conditions, to obtain a 10-hydroxy-11-lower alkanoylamino derivative of Formula III. The latter can then be reacted with a halogenation agent, e.g., thionyl chloride, to obtain the corresponding 10-halo-11-lower alkanoylamino derivative of Formula III with retention of the steric configuration. Alternatively, the 10-hydroxy-11-lower alkanoylamino derivative of Formula III, obtained by conventional acylation as indicated above, can be further acylated at the 10-position to derive the corresponding 10-lower alkanoyloxy-11-lower alkanoylamino derivative. By acylation under high temperature, the latter compound, namely, the 10-lower alkanoyloxy-11-lower alkanoylamino derivative, can be obtained directly from the corresponding 10-hydroxy-11-amino compound of Formula III. In another variation, the 10-hydroxy-11-amino compounds of Formula III can be acylated to form the corresponding 10-hydroxy-11-halo-lower alkanoylamino derivative. Also, when $Q_1$ and $Q_2$ are each a substituent other than hydrogen and $P_1$ is hydroxy, acylation will result in the preparation of the corresponding 10-lower alkanoyloxy-11-di-substituted amino derivatives.

The compounds of Formula III can exist in two epimeric form which differ in the configuration of the substituents at carbon atom-10. The compounds of Formula VII wherein $P_1$ is hydroxy and $P_3$ is halogen exist in the trans form. When those compounds are aminated to form compounds of Formula III, the trans form at carbon-10 is maintained. The trans-10-hydroxy-11-amino compounds of Formula III thus obtained, when $Q_1$ and $Q_2$ are each hydrogen, can be converted into the corresponding cis-10-hydroxy-11-amino compounds in a conventional manner, for example, through an intermediate containing an oxazoline ring; that is, the trans-10-hydroxy-11-amino compound can be acylated, for example, by N-benzoylation, and subsequently cyclized with inversion of the substituents at carbon atom-10. The oxazoline ring can then be cleaved by acid hydrolysis resulting in the formation of the corresponding cis-10-hydroxy-11-amino compound. The trans-10-hydroxy-11-amino compounds of Formula III (when the amino group is not acylated) can be converted into the corresponding cis-10-halo-11-amino compounds by reaction of the former with thionyl chloride. The reaction results in both the replacement of the hydroxyl group in the 10-position by chlorine and an inversion at the 10-position.

The compounds of this invention will form pharmaceutically acceptable acid addition salts with both inorganic and organic acids. For example, salts can be prepared by treatment of the reaction products with hydrohalic acids, e.g., hydrochloric acid, hydrobromic acid or with other mineral acids, e.g., sulfuric acid, phosphoric acid or nitric acid or with organic acids, e.g., tartaric acid, citric acid, oxalic acid, camphorsulfonic acid, ethane-sulfonic acid, para-toluenesulfonic acid, salicyclic acid, ascorbic acid, maleic acid, mandelic acid, etc. The preferred salts are those formed from the hydrohalides, especially the hydrochlorides. The pharmaceutically acceptable acid addition salts are preferably prepared by treatment of the base with the corresponding acid in an inert solvent. Salts with non-pharmaceutically acceptable acids can be converted into salts with pharmaceutically acceptable acids by neutralization followed by reaction with pharmaceutically acceptable acids or by conventional metathetic reaction.

The compounds of this invention are pharmaceutically useful, for example, as anitidepressants, e.g., to reverse both endogenous and exogenous depression of the central nervous system.

Outstanding among the agents useful to reverse depression of the central nervous system are 2-iminodibenzocyclohept-oxazolidinones, trans-10-hydroxy-11-acetamidodibenzo[a,d]cyclohepta[1,4]dien-5-one and d,1-11-piperazinodibenzo[a,d]cyclohepta[1,4]diene-5,10-dione. The compounds of this invention exhibit remarkably slight anticholinergic side effects. They can be administered either as the free base or in the form of their pharmaceutically acceptable acid addition salts or can be administered in a conventional pharmaceutical formulation. That formulation can contain an inert organic or inorganic pharmaceutical carrier suitable for enteral or parenteral application, e.g., water, gelatin, lactose, starch, magnesium stearate, talc, vegetable oils, gums, olein alcohols, Vaseline, etc. The pharmaceutical preparations can be administered in solid form, e.g., tablets, dragees, suppositories, or capsules or in liquid form, e.g., solutions, suspensions or emulsions. They may be sterilized and may contain additives for preserving their shelf life, e.g., antioxidants or stabilizing, wetting or emulsifying agents or salts for adjusting the osmotic pressure or buffers. Compounds of this invention can be combined with other therapeutically valuable materials in a variety of pharmaceutical preparations.

The present invention is further disclosed in the following examples, which are illustrative but not limitative thereof. All temperatures are in degrees Centigrade.

EXAMPLE 1

12.0 gms. of d,l-trans-10-hydroxy-11-amino-10,11-dihydrodibenzo[a,d]cyclohepten-5-one were dissolved in 600 ml. of methanol and the solution was slightly heated. After cooling to room temperature, there was introduced into that solution, with stirring, a solution of 5.3 gms. of cyanogen bromide dissolved in 20 ml. of methanol. The reaction mixture was left standing at room temperature for 3 days. It was subsequently evaporated under reduced pressure to a volume of approximately 50 ml. and, after cooling, treated with 500 ml. of absolute ether. There crystallized out crude d,l-trans-2-imino-2,3;3a,12b-tetrahydro-8H-dibenzo[3,4;6,7]cyclohept[1,2-d]oxazole- 8-one hydrobromide which melted at 224°–225°C. (decomposition) after repricipitation from methanol/ether.

In an analogous manner there was obtained, when employing d,1-trans-10-hydroxy-11-methylamino-10,11-dihydro-dibenzo[a,d] cyclohepten-5-one, d,1-trans-2-imino-3-methyl-2,3;3a,12b-tetrahydro-8H-dibenzo[3,4;6,7]cyclohept[1,2-d]oxazole-8-one hydrobromide, m.p. 264°–265°C. (decomposition).

The d,1-trans-10-hydroxy-11-amino(or methylamino)-10, 11-dihydro-dibenzo[a,d]cyclohepten-5-one employed in Example 1 as starting compound can, for example, be manufactured as follows: (a) 110 gms. of 10,11-epoxy-10,11-dihydro-dibenzo [a,d]cyclohepten-5-one and 1000 ml. of aqueous ammonia (about 28 percent) were reacted in a 2 liter lined stainless steel shaking autoclave and shaken at 110°C. for 1 hour. After cooling, the crude product was filtered off by suction, washed with water and dissolved with cooling in 3N aqueous hydrochloric acid. The solution was extracted with 200 ml. of chloroform, filtered over active charcoal and made alkaline with 3N aqueous ammonia while simultaneously cooling the solution in an ice bed. The d,1-trans-10-hydroxy-11-amino-10,11-dihydro-dibenzo[a,d]cyclohepten-5-one which crystallized out was filtered off by suction and thoroughly washed with water. The base melted at 205°–206°C. after recrystallization from ethanol.

(b) 11.1 gms. of 10,11-epoxy-10,11-dihydro-dibenzo[a,d]cyclohepten-5-one and 50 liters of dioxane were reacted with 15.5 gms. of methylamine in a 0.3 liter stainless steel autoclave with stirring device and heated at 110°C. with stirring for 8 hours. After cooling, the volatile portions were evaporated under reduced pressure, the residue was dissolved in absolute alcohol, made congo-acid red with alcoholic hydrochloric acid and the hydrochloride precipitated with ether. For conversion into the free base, the hydrochloride was dissolved in water, made alkaline with aqueous ammonia, whereby d,1-trans-10-hydroxy-11-methylamino-10,11-dihydrodibenzo[a,d]cyclohepten-5-one crystallized out. After a few hours, the base was filtered off and washed with water. After recrystallization from ethanol, it melted at 198°–199°C.

Under the reaction conditions described immediately above, 10.11-epoxy-dibenzo[a,d]cyclohepta[1,4]dien-5-one can be reacted with further primary and secondary amines. There is obtained, for example, when employing
Dimethylamine:
d,1-trans-10-hydroxy-11-dimethylamino-dibenzo[a,d]cyclohepta [1,4]dien-5-one hydrochloride, m.p. 145°–148°Ethylamine:
d,1-trans-10-hydroxy-11-ethylamino-dibenzo[a,d]cyclohepta[1,4]dien-5-one, m.p. 158°–159° Diethylamine:
d,1-trans-10-hydroxy-11-diethylamino-dibenzo[a,d]cyclohepta [1,4]dien-5-one hydrochloride, m.p. 169°–173°Cyclopropylamine:
d,1-trans-10-hydroxy-11-cyclopropylamino-dibenzo[a,d]cyclohepta [1,4]dien-5-one hydrochloride, m.p. 201–202° (decomposition).

EXAMPLE 2

A strong steam of phosgene was passed at room temperature with stirring for 3 hours into a suspension of 5.1 gms. of d,1-trans-10-hydroxy-11-methylamino-10.11-dihydro-dibenzo [a,d]cyclohepten-5-one and 13.4 gms. of lead (2) carbonate in 400 gms. of alcohol-free chloroform. Excess phosgene was removed by passing in air. The reaction mixture was subsequently filtered off by suction, and the filtration residue was washed with 50 ml. of chloroform. The filtrate was evaporated to dryness under reduced pressure. The d,-1-trans-3-methyl-2,3;3a,12b-tetrahydro-8H-dibenzo-[3,4;6,7]cyclohept[1,2-d]oxazole-2,8-dione, which remained behind, melted at 169°–171°C. after recrystallization from methanol.

EXAMPLE 3

10.2 gms. of d,1-trans-10-hydroxy-11-methylamino-10,11-dihydro-dibenzo [a.d]cyclohepten-5-one and 100 ml. of absolute acetone were admixed with 2 gms. of p-toluene-sulfonic acid and the reaction mixture was heated at reflux for 48 hours. The reaction mixture was subsequently evaporated to dryness under reduced pressure. The 2,2,3-trimethyl-2,3;3a,12b-tetrahydro-8H-dibenzo[3,4;6,7]cyclohept[1,2-d]oxazole-8-one which remained behind melted at 122°–123°C. after several recrystallizations from methanol.

EXAMPLE 4

2.5 gms, of d,1-trans-10-hydroxy-11-methylamino-10,11-dihydro-5H-dibenzo[a,d]cyclohepten-5-one in 20 ml. of water were reacted with 8 gms. of carbon disulfide in 20 ml. of 3N sodium hydroxide at room temperature with constant stirring for 2 days. Initially the reaction mixture consisted of a complete solution, but toward the end of the reaction time, a reaction product crystallized out. The carbon disulfide was then evaporated off under reduced pressure. The residue was filtered by suction and washed with water. The product, d,1-trans-2-thio-3-methyl-2,3;3a,12b-tetrahydro—8H-dibenzo[3,4;6,7]cyclohept[1,2-d]-oxazole-8-one, was then recrystallized from ethanol and melted at 217°C.

EXAMPLE 5

2.5 gms. of d,1-trans-10-hydroxy-11-methylamino-10,11-dihydro5H-dibenzo[a,d]cyclohepten-5-one were reacted with 1.2 gms. of benzaldehyde in 20 ml. of absolute benzene for 16 hours at reflux temperature. After cooling the solvent was evaporated under vacuum. Ethanol was then added to the remaining yellow oil and a crystalline precipitate was obtained. After recrystallization from ethanol, d,1-trans-2-phenyl-3-methyl-2,3;3a,12b-tetrahydro-8H-dibenzo[3,4;6,7]cyclohept[1,2-d]oxazole-8-one was obtained and melted at 125°–126°C.

EXAMPLE 6

2.5 g of d,1-trans-10-hydroxy-11-methylamino-10,11-dihydro-5H-dibenzo[a,d]cyclohepten-5-one, 20 ml of absolute benzene, 10 ml of acetaldeyde and 20 g of p-toluenesulphonic and are kept at reflux conditions for 20 hours, whereby a brown solution is formed. After cooling the reaction mixture is added to an excess of 5 percent sodium carbonate solution; the benzene phase is thereafter washed with water, dried over potasium carbonate and the benzene is evaporated under reduced pressure. The oily, yellow residue is brought to crystallize in a small amount of ethanol. After recyrstallization from methanol there is obtained pure d,1-trans-2,3-dimethyl-2,3;3a,12b-tetrahydro-8H-dibenzo [3,4;6,7]cyclohepta[1,2-d]oxazol-8-one, melting at 128°C.

EXAMPLE 7

22.2 gms. of 10,11-epoxy-dibenzo[a,d]cyclohepta[1,4] dien-5-one were reacted with 21.8 gms. of morpholine at 150°C. for 3 hours with stirring in a 200 ml. sulfonation flask employing a thermometer, a reflux condenser and a stirrer. The epoxide was thereby completely solubilized. After cooling, the reaction mixture was concentrated under reduced pressure at 60°C., the residue was dissolved in 20 ml. of absolute ethanol (to get complete solution, the reaction mixture was heated) and made congo-acid red with alcoholic hydrochloric acid. The hydrochloride which precipitated after the addition of 800 ml. of absolute ether was permitted to stand for several hours and then filtered off by suction and washed three times with 100 ml. of absolute ether each time. The filter residue was dissolved in about 200 ml. of water. The solution was filtered and made alkaline by the addition of 3N ammonia-alkaline aqueous solution. After a few hours, the precipitated base was filtered off by suction and neutralized by washing with water. The d,1-trans-10-hydroxy-11-morpholino-dibenzo[a,d]cyclohepta [1,4]dien-5-one melted at 246°–247°C. (decomposition) after recrystallization from dioxane.

The epoxide used as the starting material can, for example, be manufactured as follows:

300 ml. of methanol, 8 gms. of potassium bicarbonate, 82.4 gms. of dibenzo [a,d]cyclohepta[1,4,6]trien-5-one, 41.6 gms. of benzonitrile and 50 ml. of 30 percent hydrogen peroxide were mixed together and intensively stirred at room temperature in a 1,000 ml. flask for 24 hours. After a further addition of 41.6 gms. of benzonitrile and 50 ml. of 30 percent hydrogen peroxide in 100 ml. of methanol, the reaction mixture was further stirred for 120 hours, then treated with 500 ml. of water, filtered after brief but thorough stirring and washed with 300 ml. of a mixture of methanol/water 1:1. The filter residue was suspended in about 300 ml. of 40 percent sodium bisulphite solution. The suspension was stirred for 1 hour at 50°C. and then cooled and filtered. The filter residue was again washed with a mixture of methanol/water 1:1 and dried under reduced pressure at 50°C. The well-dried crude product was digested in about 500 ml. of high-boiling petroleum ether, filtered therefrom and dried. After recrystallization from acetic ester, the 10,11-epoxy-dibenzo[a,d-]cyclohepta [1,4]dien-5-one melted at 127°-130°C.

The 10,11-epoxy-dibenzo[a,d]cyclohepta[1,4]dien-5-one can, under the reaction conditions described in this Example, be reacted, for example, with the following mono- and di-substituted amines. For example, when employing
N-2-hydroxyethyl-N-ethylamine, there was obtained:
d,1-trans-10-hydroxy-11N-(2-hydroxy-ethyl-N-ethyl)-amino-dibenzo[a,d]cyclohepta[1,4]dien-5-one hydrochloride, m.p. 143°-147° Pyrrolidine, there was obtained:
d,1-trans-10-hydroxy-11-pyrrolidino-dibenzo[a,d]cyclohepta[1,4]dien-5-one, m.p. 135° Benzylamine, there was obtained:
d,1-trans-10-hydroxy-11-benzylamino-dibenzo[a,d]cyclohepta[1,4]dien-5-one alcohol, m.p. 98°-100° Piperidine, there was obtained:
d,1-trans-10-hydroxy-11-piperidino-dibenzo[a,d]cyclohepta[1,4]dien-5-one, m.p. 129° Isopropyl-hydrazine, there was obtained:
d,1-trans-10-hydroxy-11-(2-isopropylhydrazino)-dibenzo[a,d]cyclohepta[1,4]dien-5-one hydrochloride, m.p. 206° Piperazine, there was obtained:
d,1-trans-10-hydroxy-11-piperazino-dibenzo[a,d]cyclohepta[1,4]dien-5-one, m.p. 241°-243° (decomposition) p-chloro-benzylamine, there was obtained:
d,1-trans-10-hydroxy-11-(4-chloro-benzylamino)-dibenzo[a,d]cyclohepta[1,4]dien-5-one, m.p. 136°-137° Diethylamino-propylamine, there was obtained:
d,1-trans-10-hydroxy-11-(3-diethylamino-propylamino)-dibenzo[-a,d]cyclohepta[1,4]dien-5-one, m.p. 85°-87°.

EXAMPLE 8

3.0 gms. of d,1-trans-10-hydroxy-11-bromo-dibenzo[a,d]cyclohepta[1,4]dien-5-one was reacted with 1.7 gms. of piperidine by heating on a water-bath for 2 hours. After cooling, the reaction mixture which thereby solidified and turned orange in color was treated with 50 ml. each of benzene and water and vigorously shaken until the reaction mixture had completely gone into solution. The organic phase was washed three times with 50 ml. of water each time, dried over potassium carbonate and made congo-acid red with ethereal hydrochloric acid, whereby the crude hydrochloride crystallized out. The precipitation was made complete by addition of 200 ml. of absolute ether. After standing for several hours, the reaction product was filtered off by suction, washed with 100 ml. of absolute ether, dissolved in a mixture of 20 ml. of water and 20 ml. of ethanol and filtered. The filtrate was made alkaline with 3N ammonia. The precipitated d,1-trans-10-hydroxy-11-piperidino-dibenzo[a,d]cyclohepta[1,4]dien-5-one melted at 129°C. after recrystallization from methanol.

The d,1-trans-10-hydroxy-11-bromo-dibenzo[a,d-]cyclohepta [1,4]dien-5-one which was employed in this Example can be manufactured as follows:

6.9 gms. of N-bromo-acetamide were dissolved with stirring in a mixture of 100 ml. of dioxane and 50 ml. of water to which a few crystals of p-toluene-sulfonic acid were added. 10.3 gms. of dibenzo[a,d]cyclohepta[1,4,6]trien-5-one were introduced portionwise into the reaction mixture solution. The solution was further stirred for about 1 hour until all reactants had gone into solution. The solution was left standing at room temperature. After about 20 hours, the d,1-trans-10-hydroxy-11-bromo-dibenzo[a,d]cyclohepta[1,4]dien-5-one began to crystallize out. The ketone was filtered off and washed with 50 ml. of water. After recrystallization from acetic ester/cyclohexane, it melted at 149°C.

From the mother- and wash-liquor there can be isolated further portions of this compound by extraction with ether. Starting from 10,11-epoxy-dibenzo[a,d]cyclohepta[1,4]dien-5-one, the same compound was obtained in the following way:

In a 5 liter four-necked round flask with stirrer, condenser, gas inlet tube and dropping-funnel, 6 gms. of magnesium shavings were covered over with 100 ml. of absolute ether. After the addition of a grain of iodine, a few drops of a solution of 48 gms. of 1,2-dibromo-ethane in 600 ml. of absolute ether were added dropwise with the simultaneous introduction of nitrogen gas and under constant stirring until the reaction mixture began boiling. The flow of the solution was so adjusted that the reaction mixture boiled moderately. After complete addition, the mixture was heated at reflux for an additional hour, whereby all the magnesium went into solution. A solution of 50 gms. of 10,11-epoxy-dibenzo[a,d]cyclohepta[1,4dien-5-one in 4,500 ml. of absolute ether was subsequently added to the mixture in one pouring. The reaction mixture was heated under reflux conditions initially for 10 hours and, after the addition of 100 ml. of dioxane, for an additional 5 hours. After cooling, the dioxane-(magnesium bromide) complex was filtered off by suction and washed with 500 ml. of absolute ether. The filtrate was evaporated to dryness under reduced pressure. The residue was dissolved in about 150 ml. of acetic ester. The solution was filtered and treated at boiling heat with about 200 ml. of cyclohexane up to the beginning of turbidity. The pure d,1-trans-10-hydroxy-11-bromo-dibenzo[a,d]cyclohepta[1,4]dien-5-one which crystallized out on cooling melted at 149°C.

EXAMPLE 9

47.9 gms. of d,1-trans-10-hydroxy-11-amino-dibenzo[a,d]cyclohepta[1,4]dien-5-one (obtained as described above in Example 1(a) were placed in a 1.5 liter sulfonation flask equipped with stirrer, reflux condenser, gas inlet tube, thermometer and dropping-funnel and suspended in 900 ml. of chloroform. A solution of 108 gms. of thionyl chloride in 100 ml. of chloroform was thereafter added dropwise with stirring at room temperature, the reaction being slightly exothermic. The reaction mixture was then heated at reflux temperature for 1 hour, whereby the ketone reactant dissolved with brown coloration. This solution was cooled and poured on 500 gms. of ice. The organic phase was separated and washed twice with 200 ml. of water each time. The combined aqueous solutions and extracts were shaken with active charcoal, filtered and made alkaline with 3N aqueous ammonia with ice-cooling. The crude product which crystallized out was filtered off after a few hours and washed neutral and chloride-free with water. The d,1-cis-10-chloro-11-amino-dibenzo[a,d]cyclohepta[1,4]dien-5-one melted at 155°C. after recrystallization from dioxane/ethanol.

As described above, when employing d,1-trans-10-hydroxy11-methylamino-dibenzo[a,d]cyclohepta[1,4-]dien-5-one (obtained according to Example 1(b)), there is obtained: d,1-cis-10-chloro-11-methylamino-dibenzo[a,d]cyclohepta[1,4]dien-5-one, m.p. 165°C. (decomposition).

EXAMPLE 10

12.0 gms. of d,1-trans-10-hydroxy-11-amino-dibenzo[a,d]cyclohepta[1,4]dien-5-one (obtained according to Example 1(a)), were dissolved in 600 ml. of absolute tetrahydrofuran in a 1.5 liter sulfonation flask with stirrer, thermometer and dropping-funnel and cooled to 0°C. At this temperature there was added dropwise 9 gms. of triethylamine and subsequently a solution of 4 ml. of chloro-acetyl chloride in 100 ml. of absolute tetrahydrofuran. The reaction mixture was stirred for 2 hours at 0°C., made congo-acid red with ethereal hydrochloric acid and, after the addition of 600 ml. of absolute ether, filtered. The filter residue was washed with 200 ml. of absolute ether. The filtrate was concentrated to dryness under reduced pressure. The d,1-trans-10-hydroxy-11-chloroacetamido-dibenzo[a,d]cyclohepta[1,4]dien-5-one which remained behind melted at 145°C. after recrystallization from aqueous ethanol.

In an analogous manner, there was obtained according to the process described above, when employing cyclopropyl carboxylic acid chloride:
d,1-trans-10-hydroxy-11-cyclopropylcarbonylamido-dibenzo[a,d]cyclohepta[1,4]dien-5-one, m.p. 171°C. (benzene) and when employing β-chloro-propionic acid chloride:
d,1-trans-10-hydroxy-11-(3-chloro-propionamido)-dibenzo[a,d]cyclohepta[1,4]dien-5-one, m.p. 183°-184°C. (benzene).

EXAMPLE 11

12.0 gms, of d,1-trans-10-hydroxy-11-amino-dibenzo[a,d]cyclohepta[1,4]dien-5-one (obtained according to Example 1(a)) was dissolved in 2,000 ml. of chloroform and reacted with 7.1 gms. of benzoyl chloride, 50 ml. of 1N caustic soda and 250 ml. of water. The reaction mixture was shaken for 16 hours at room temperature. The organic phase was separated and washed with 500 ml. of water, 500 ml. of 0.1N hydrochloric acid and three times with 500 ml. of water each time, dried over calcium chloride, filtered and evaporated to dryness under reduced pressure. The d,1-trans-10-hydroxy-11-benzamido-dibenzo[a,d]cyclohepta[1,4]dien-5-one which remained behind melted at 160°C. after recrystallization from aqueous methanol.

In an analogous manner, there was obtained according to the process described immediately above whem employing 2-methyl-propionyl chloride:
d,1-trans-10-hydroxy-11-(2-methyl-propionamido)-dibenzo[a,d] cyclohepta[1,4]dien-5-one, m.p. 225°-226°C. When reacting d,1-trans-10-hydroxy-11-methylamino-dibenzo[a,d]cyclohepta[1,4]dien-5-one (obtained according to Example 1(b)) with β-chloropropionyl chloride, in the manner described above, d,-1-trans-10-hydroxy-11-(N-methyl-N-3-chloropropionamido)-dibenzo[a,d]cyclohepta[1,4]dien-5-one, m.p. 207°C. (decomposition) was obtained. When starting from d,1-cis-10chloro-11-methylamino-dibenzo[a,d]cyclohepta[1,4]dien-5-one (obtained according to Example 6) in an analogous manner when employing β-chloropropionyl chloride there was obtained: d,1-cis-10-chloro-11(N-methyl-N-3-chloropropionamido)-dibenzo [a,d]cyclohepta[1,4]dien-5-one, m.p. 135°-136°C.

EXAMPLE 12

6.8 gms. of d,1-cis-10-chloro-11-methylamino-dibenzo[a,d]cyclohepta[1,4]dien-5-one (obtained according to Example 8) were dissolved in 100 ml. of absolute pyridine in a 300 ml. ERLENMEYER flask and reacted dropwise with 2.3 gms. of propionic acid chloride while cooling the reaction mixture in an ice bed. After standing for 24 hours at room temperature, the reaction mixture was poured on ice and acidified with stirring and cooling with 3N sulfuric acid. The d,1-cis-10-chloro-11-(N-methyl-N-propionamido)-dibenzo[a,d]cyclohepta[1,4]dien-5-one which precipitated was filtered off and neutralized by washing with water. After recrystallization from ethanol, the compound melted at 174°-175°C. (decomposition).

EXAMPLE 13

15 ml. of redistilled thionyl chloride were reacted in smaller quantities which constantly stirring and cooling with 8.5 gms. of d,1-trans-10-hydroxy-11-benzamido-dibenzo[a,d]cyclohepta[1,4]dien-5-one (obtained according to Example 10). With each small quantity of reactant added to thionyl chloride enough time was allowed to elapse to achieve complete solution. The reaction mixture was subsequently heated under reflux conditions at 50°-55°C. for 2.5 hours and, after cooling, poured into 400 ml. of absolute ether. The 2-phenyl-dibenzo[a,d]cyclohepta[1,4]dien[f]oxazole-8-one hydrochloride formed was filtered off after 6 hours, washed three times with 50 ml. of absolute ether each time and, without further purification, heated under reflux conditions for 5 hours with 30 ml. of 3N hydrochloric acid. After cooling, the precipitated benzoic acid was filtered off and the filtrate was made alkaline, while stirring and cooling, with 3N ammonia. The base, d,1-cis-10-hydroxy-11-amino-dibenzo[a,d]cyclohepta[1,4] dien-5-one, which precipitated in crystalline form, was filtered off after a few hours and washed three times with 50 ml. of water each time. The base melted at 178°-179°C. after recrystallization from ethanol.

EXAMPLE 14

12.0 gms. of d,1-trans-10-hydroxy-11-amino-dibenzo[a,d]cyclohepta[1,4]dien-5-one (obtained according to Example 1(a)) were dissolved in 100 ml. of 3N acetic acid and filtered. The filtrate was treated with 10 gms. of acetic anhydride and heated for 10 minutes on the steam bath. The base, d,1-trans-10-hydroxy-11-acetamido-dibenzo[a,d]cyclohepta[1,4-]dien-5-one, which precipitated on cooling, was filtered off after standing for 24 hours and washed neutral with water. The base melted at 217°C. after recrystallization from aqueous ethanol.

In an analogous manner, there was obtained according to the process described in Example 12, when employing d,1-trans-10-hydroxy-11-methylamino-dibenzo[a,d]cyclohepta[1,4]dien-5-one (obtained according to Example 1(b)):
d,1-trans-10-hydroxy-11-N-methyl-N-acetamido-dibenzo[a,d]cyclohepta[1,4]dien-5-one, m.p. 256°–258°C. (decomposition) when employing d,1-cis-10-hydroxy-11-amino-dibenzo[a,d]cyclohepta[1,4]dien-5-one (obtained according to Example 12):
d,1-cis-10-hydroxy-11-acetamido-dibenzo[a,d]cyclohepta[1,4]dien-5-one, m.p. 197°–198°C.

EXAMPLE 15

2.4 gms. of d,1-trans-10-hydroxy-11-amino-dibenzo[a,d]cyclohepta[1,4]dien-5-one (obtained according to Example 1(a)) and 5 gms. of acetic anhydride were reacted by heating at reflux temperature for 20 minutes. After cooling, the solution obtained was treated with 10 ml. of water. After standing for several hours, the product, d,1-trans-10-acetoxy-11-acetamidodibenzo[a,d]cyclohepta[1,4]dien-5-one, which precipitated, was filtered off and washed with water. The product melted at 219°–220°C. after recrystallization from ethanol.

In an analogous manner, there was obtained according to the process described in this Example when employing d,1-trans-10-hydroxy-11-methylamino-dibenzo[a,d]cyclohepta[1,4]dien-5-one (obtained according to Example 1(b)):
d,1-trans-10-acetoxy-11-N-methylacetamido-dibenzo[a,d]cyclohepta [1,4]dien-5-one, m.p. 142°–145°C.

EXAMPLE 16

12.0 gms. of d,1-trans-10-hydroxy-11-amino-dibenzo[a,d]cyclohepta[1,4]dien-5-one (obtained according to Example 1(a)) were dissolved in 200 ml. of 25 percent formic acid, filtered, reacted with 50 ml. of acetic anhydride and heated on the steam bath for 15 minutes. After cooling, the reaction mixture was treated with 100 ml. of water. After standing for several hours, the product, d,1-trans-10-hydroxy-11-formamido-dibenzo[a,d]cyclohepta [1,4]dien-5-one, crystallized out. After standing at room temperature for 24 hours, the product was filtered off and washed neutral with water. After recrystallization from aqueous ethanol the product melted at 205°–206°C.

EXAMPLE 17

6 ml. of distilled thionyl chloride were placed in a 50 ml. round flask and reacted in small quantities at a time, while constantly stirring and cooling, with 2.8 gms. of d,1-trans-10-hydroxy-11-acetamido-dibenzo[a,d]cyclohepta[1,4]dien-5-one (obtained according to Example 13). With the addition of each small quantity of reactant to the thionyl chloride, enough time was permitted to elapse until complete dissolution was achieved. The reaction mixture was subsequently heated under reflux conditions at 50°–55°C. for 2.5 hours, then cooled and poured into 150 ml. of absolute ether. The d,1-trans-10-chloro-11-acetamido-dibenzo[a,d]cyclohepta[1,4]dien-5-one, after recrystallization from ethanol, melted at 205°–206°C. (decomposition).

EXAMPLE 18

3.2 gms. of d,1-trans-10-hydroxy-11-chloroacetamido-dibenzo[a,d]cyclohepta[1,4]dien-5-one (obtained according to Example 9), 1.8 gms. of piperidine and 20 ml. of toluene were reacted by heating under reflux conditions for 5 hours in a 50 ml. round flask with attached ascending tube. After cooling, 20 ml. of water were added. The organic phase was washed 5 times with 20 ml. of water each time, dried over potassium carbonate and filtered. The filtrate was made congo-acid red with ethereal hydrochloric acid, whereby the crude hydrochloride crystallizes out.

The precipitation was made complete by the addition of 150 ml. of absolute ether and the reaction mixture was filtered after a few hours. The hygroscopic filter residue was further washed three times with 50 ml. of absolute ether each time and dissolved in about 20 ml. of aqueous methanol. The free base was obtained by the addition of 3N aqueous ammonia until alkaline pH was reached and then crystallized out by heating. The base, d,1-trans-10-hydroxy-11-(1-piperidino-acetamido)-dibenzo[a,d] cyclohepta[1,4]dien-5-one, thus obtained, melted at 90°–91°C. after recrystallization from aqueous methanol.

EXAMPLE 19

13.0 gms. of d,1-cis-10-chloro-11-amino-dibenzo[a,d]cyclohepta[1,4]dien-5-one (obtained according to Example 8) were dissolved with heating in 3,600 ml. of about 95 percent ethanol in a 6 liter ERLENMEYER flask. The solution was filtered and, after the addition of 1.5 gms. of 5 percent palladium/charcoal, hydrogenated with shaking at room temperature. After about 2 hours, the theoretical quantity of hydrogen (1 mole) was absorbed. The solution was separated from catalyst and evaporated to dryness under reduced pressure. The residue was dissolved by heating in 40 ml. of ethanol. The solution was filtered and made alkaline with 3N ammonia solution. The product, d,1-10-aminodibenzo[a,d]cyclohepta[1,4]dien-5-one, which crystallized out on cooling, melted at 146°C. after recrystallization from ethanol.

According to the process described in Example 11, using this product as the starting material, there was obtained d,1-10-acetamido-dibenzo[a,d]cyclohepta[1,4]dien-5-one.

EXAMPLE 20

3.0 gms. of d,1-11-bromo-dibenzo[a,d]cyclohepta[1,4]diene-5-10-dione were reacted with 2.2 gms. of N-methyl-piperazine. The reaction occurred immediately on heating. The reaction mixture was further heated on the steam bath for 2 ½ hours, then cooled and treated with 20 ml. each of benzene and water, whereby, after vigorous shaking, complete solution was obtained. The benzene phase was washed 5 times with 20 ml. of water each time, dried over potassium carbonate and treated with ethereal hydrochloric acid to congo-acid red reaction, whereby the hydrochloride crystallized out. The precipitation was made complete by the addition of 200 ml. of absolute ether. The d,1-11-(4-methyl-piperazino)-dibenzo[a,d]cyclohepta[1,4]diene-5,10-dione hydrochloride which was isolated after a few hours, after recrystallization from ethanol/ether, melted at 271°C. (decomposition).

According to the process described in this Example, there was obtained in an analogous manner when employing piperazine:

d,1-11-piperazino-dibenzo[a,d]cyclohepta[1,4]diene-5,10-dione hydrochloride, m.p. 291°–292°C. (decomposition).

The d,1-11-bromo-dibenzo[a,d]cyclohepta[1,4]diene-5,10-dione employed as starting compound can, for example, be manufactured as follows:

3.0 gms. of d,1-trans-10-hydroxy-11-bromo-dibenzo[a,d]cyclohepta[1,4]dien-5-one (obtained according to Example 7), 1.7 gms. of sodium dichromate (+2 $H_2O$) and 10 ml. of glacial acetic were cooled to 0°C. and reacted dropwise at that temperature with an ice-cooled mixture of 1.3 ml. of concentrated sulfuric acid and 0.6 ml. of water. After stirring for 12 hours, the reaction mixture was treated with 25 ml. of water. The d,1-11-bromo-dibenzo[a,d]cyclohepta[1,4]diene-5,10-dione which precipitated was filtered off and washed three times with 25 ml. of water each time. After recrystallization from methanol, the compound melted at 172°C.

EXAMPLE 21

1.5 gms. of d,1-trans-10-hydroxy-11-piperidino-dibenzo[a,d]cyclohepta[1,4]dien-5-one (obtained according to Example 7) were heated under reflux conditions for 15 minutes with 5 ml. of acetic acid anhydride. The solution was then poured, with constant stirring, into 50 ml. of water and made alkaline with 3N ammonia. The crystals which precipitated were filtered off after a few hours and washed neutral with water. The d,1-trans-10-acetoxy-11-piperidino-dibenzo[a,d]cyclohepta[1,4]dien-5-one melted at 145°C. after recrystallization from methanol.

EXAMPLE 22

Manufacture of capsules of the following composition:

| | |
|---|---|
| d,1-trans-2-imino-2,3;3a,12b-tetrahydro-8H-dibenzo[3,4;6,7]cyclohept[1,2-d]oxazole-8-one | 10 mg. |
| Mannitol | 110 mg. |
| Talcum | 5 mg. |
| | 125 mg. |

The active material was homogeneously mixed with the talcum and mannitol, passed through a No. 5 sieve (mesh width about 0.23 mm.) and again thoroughly mixed. The mixture was filled into gelatin capsules size No. 4.

EXAMPLE 23

Manufacture of dragees of the following composition:

| | |
|---|---|
| d,1-trans-2-imino-3-methyl-2,3;3a,12b-tetrahydro-8H-dibenzo[3,4;6,7]cyclohept[1,2-d]oxazole-8-one | 25 mg. |
| Mannitol | 100 mg. |
| Maize starch | 20 mg. |
| Talcum | 5 mg. |
| | 150 mg. |

The active material was mixed with mannitol and passed through a No. 5 sieve (mesh width about 0.23 mm.). A 10 percent aqueous paste was prepared from the maize starch and homogeneously mixed with the active material which was mixed with mannitol. The slightly moist mass was passed through a No. 3 sieve (mesh width about 1.0 mm.). The granulate obtained was dried and, after the addition of the talcum, pressed to biconvex kernels with a weight of 150 mg. The kernels obtained can be coated in the usual manner by coating with a sugar layer.

EXAMPLE 24

Manufacture of capsules of the following composition:

| | |
|---|---|
| d,1-11-piperazino-dibenzo[a,d]cyclohepta[1,4]diene-5,10-dione hydrochloride | 10 mg. |
| Mannitol | 110 mg. |
| Talcum | 5 mg. |
| | 125 mg. |

The active material was homogeneously mixed with the talcum and mannitol, passed through a No. 5 sieve (mesh width about 0.23 mm.) and again thoroughly mixed. The mixture was filled into gelatin capsules size No. 4.

EXAMPLE 25

Manufacture of dragees of the following composition:

| | |
|---|---|
| d,1-trans-10-hydroxy-11-acetamido-dibenzo[a,d]cyclohepta[1,4]dien-5-one | 25 mg. |
| Mannitol | 100 mg. |
| Maize starch | 20 mg. |
| Talcum | 5 mg. |
| | 150 mg. |

The active material was mixed with mannitol and passed through a No. 5 sieve (mesh width about 0.23 mm.). A 10 percent aqueous paste was prepared from the maize starch and homogeneously mixed with the active material which was mixed with mannitol. The slightly moist mass was passed through a No. 3 sieve (mesh width about 1.0 mm.). The granulate obtained was dried and, after addition of the talcum, pressed to biconvex kernels with a weight of 150 mg. The kernels can be coated in the usual manner by coating with a sugar layer.

We claim:

1. A compound of the formula

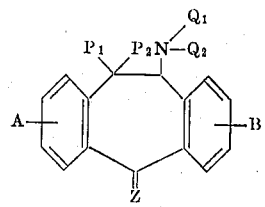

wherein A and B each is, individually, hydrogen, halogen, lower alkyl of 1 to 7 carbon atoms, lower alkoxy of 1 to 7 carbon atoms, trifluoromethyl, lower alkylmercapto of 1 to 7 carbon atoms, lower alkanoyl of 1 to 7 carbon atoms, sulfamoyl, lower alkylsulfamoyl of 1 to 7 carbon atoms of lower alkylsulfonyl of 1 to 7 carbon atoms; Z is oxo; $P_1$ is hydroxyl when $P_2$ is hydrogen, or together with $P_2$ is oxo; $Q_1$ and $Q_2$, taken together with the nitrogen atom, is piperazino or lower alkyl piperazino wherein lower alkyl is of 1 to 7 carbon atoms, or a pharmaceutically acceptable acid addition salt thereof.

2. A compound of claim 1 which is d,1-11-piperazinodibenzo[a,d]cyclohepta[1,4]diene-5,10-dione.

* * * * *